(12) United States Patent
Luo (10) Patent No.: US 8,000,036 B2
(45) Date of Patent: Aug. 16, 2011

(54) IMAGING LENS SYSTEM

(75) Inventor: Yang-Cheng Luo, Guangdong (CN)

(73) Assignees: Premier Image Technology (China) Ltd., Foshan, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 0 days.

(21) Appl. No.: 12/757,048

(22) Filed: Apr. 9, 2010

(65) Prior Publication Data

US 2011/0157722 A1 Jun. 30, 2011

(30) Foreign Application Priority Data

Dec. 25, 2009 (CN) .......................... 2009 1 0312283

(51) Int. Cl.
*G02B 9/62* (2006.01)

(52) U.S. Cl. .................. 359/756; 359/740; 359/761

(58) Field of Classification Search .................. 359/756, 359/740, 761
See application file for complete search history.

(56) References Cited

U.S. PATENT DOCUMENTS 5,786,944 A 7/1998 Hagimori et al.
7,362,509 B2 * 4/2008 Takeuchi ...................... 359/679

* cited by examiner

*Primary Examiner* — Evelyn A. Lester
(74) *Attorney, Agent, or Firm* — Zhigang Ma (57) ABSTRACT

An imaging lens system in order from the object side to the image side includes a first lens with negative refractive power, a second lens with positive refractive power, a third lens with negative refractive power, a fourth lens with positive refractive power, a fifth lens with negative refractive power and a sixth lens with positive refractive. The imaging lens system satisfies the following formulas: $Nd2>1.8$ and $Vd2<25$, where $Nd2$ is the refractive index of the second lens, $Vd2$ is the Abbe number of the second lens.

9 Claims, 9 Drawing Sheets

IMAGING LENS SYSTEM

BACKGROUND

1. Technical Field

The disclosure relates to imaging lens systems and, particularly, to an imaging lens system having a high resolution and a short overall length.

2. Description of Related Art

In order to obtain high image quality, small-sized camera modules used in thin electronic devices, such as mobile phones, personal digital assistants (PDA), or webcams for personal computers, must have imaging lens systems with high resolution but short overall length (the distance between the object-side surface of the imaging lens and the imaging plane of the camera module). Factors affecting both the resolution and the overall length of the imaging lens system, such as the number and positions of lenses, the power distribution of the lenses, and the shapes of the lenses, complicates any attempt to increase resolutions and shorten overall lengths of imaging lenses. For example, reducing the number of lenses shortens the overall length of an imaging lens system, but decreases the resolution. Conversely, increasing the number of lenses increases the resolution, but also increases the overall length of the imaging lens system.

Therefore, it is desirable to provide an imaging lens system, which can overcome the abovementioned problems.

DETAILED DESCRIPTION

Figure 1:
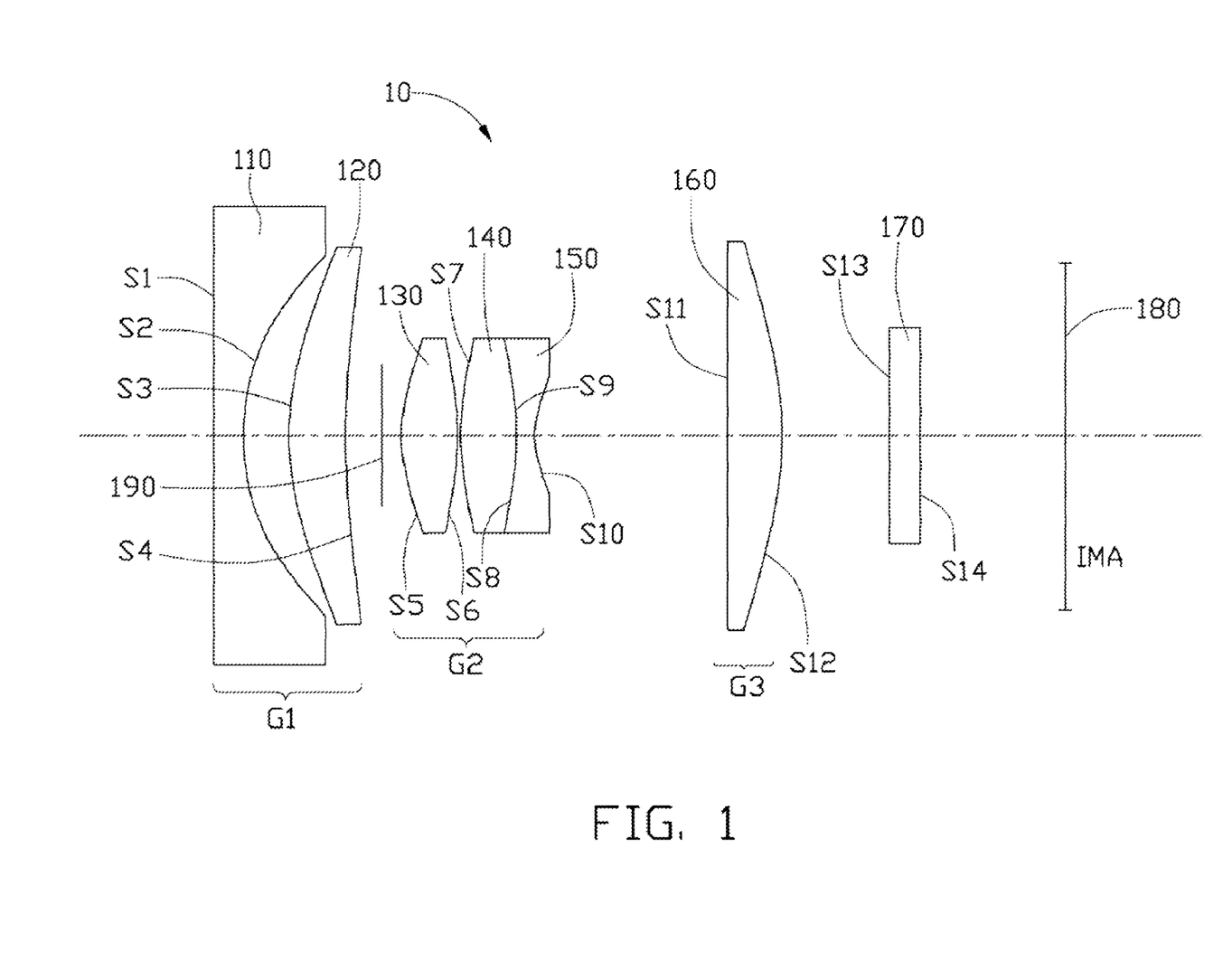
FIG. 1 is a schematic view of an imaging lens system in accordance with an exemplary embodiment.
Figure 2:
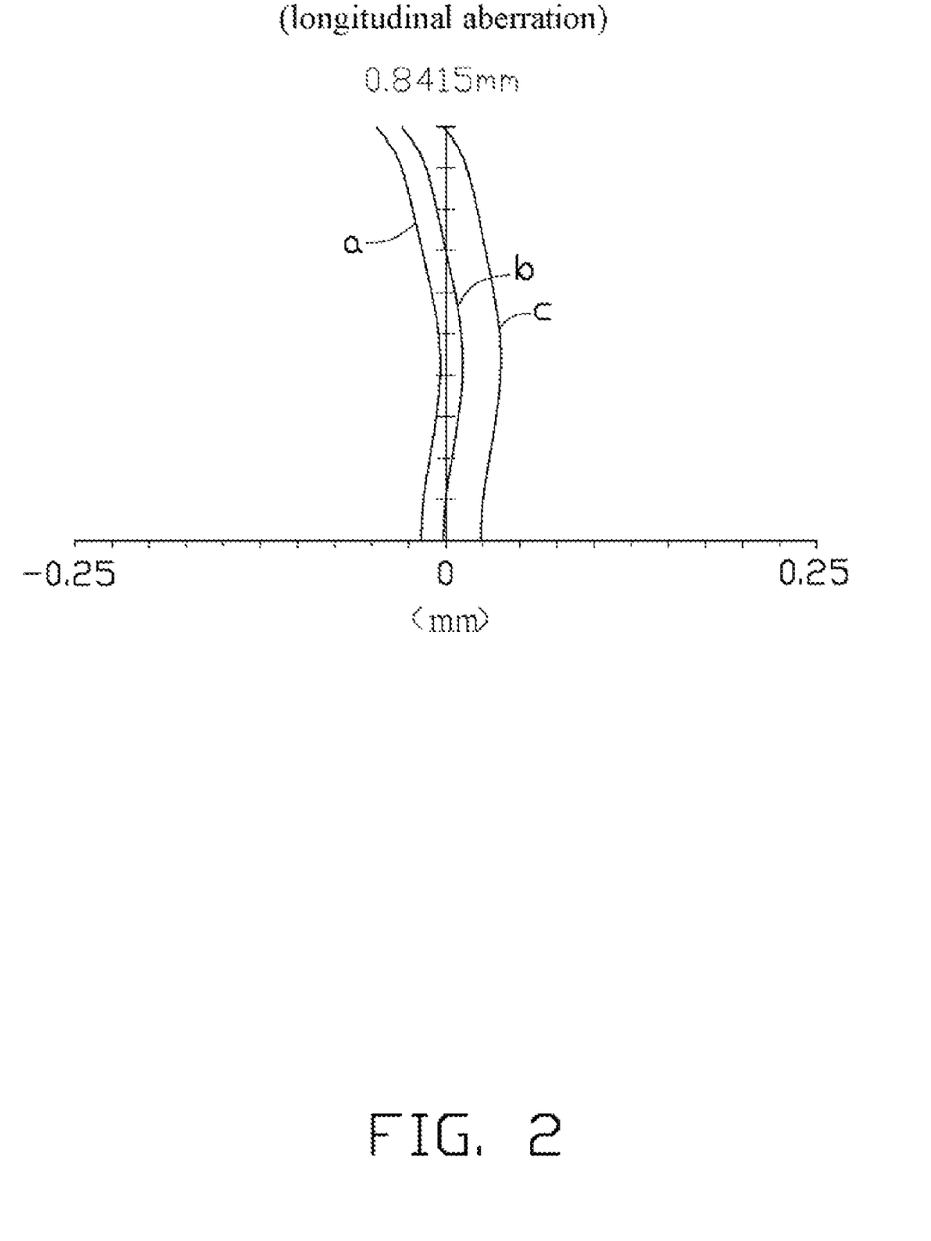
FIGS. 2-5 are graphs respectively showing longitudinal aberration, lateral aberration, field curvature, and distortion occurring in the imaging lens system in accordance with an exemplary embodiment under WIDE condition.
Figure 3:
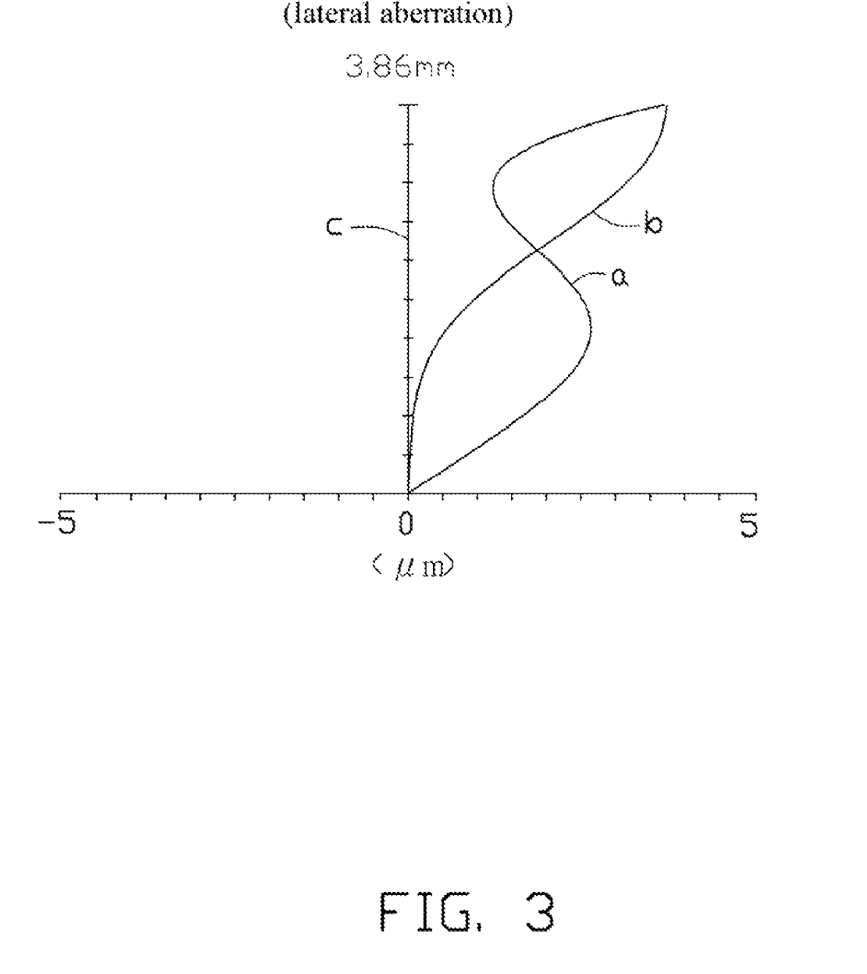

Referring to FIG. 1, an imaging lens system 10, in order from the object side to the image side, according to an exemplary embodiment, includes a first lens 110 with negative refractive power. A second lens 120 with positive refractive power, a third lens 130 with positive refractive power, a fourth lens 140 with positive refractive power, a fifth lens 150 with negative refractive power and a sixth lens 160 with positive refractive.

The first lens 110 includes a first optical surface S1 facing the object side and a second optical surface S2 facing the image side. The first optical surface S1 is a convex spherical shape. The second optical surface S2 is a concave aspheric shape.

The second lens 120 includes a third optical surface S3 facing the object side and a fourth optical surface S4 facing the image side. The third optical surface S3 is a convex aspheric shape. The fourth optical surface S4 is a concave aspheric shape. The first and second lenses 110 and 120 cooperatively constitute a first lens group G1 with negative refractive power.

The third lens 130 includes a fifth optical surface S5 facing the object side and a sixth optical surface S6 facing the image side. The fifth optical surface S5 is a convex aspheric shape. The sixth optical surface S6 is a convex aspheric shape.

The fourth lens 140 includes a seventh optical surface S7 facing the object side and an eighth optical surface S8 facing the image side. The seventh optical surface S7 is a convex spherical shape. The eighth optical surface S8 is a convex spherical shape.

The fifth lens 150 includes a ninth optical surface S9 facing the object side and a tenth optical surface S10 facing the image side. The ninth optical surface S9 is a concave spherical shape. The tenth optical surface S10 is a concave spherical shape. The third through fifth lenses 130-150, are adhered together in turns to constitute a second lens group G2 with positive refractive power.

The sixth lens 160 includes an eleventh optical surface S11 facing the object side and a twelfth optical surface S12 facing the image side. The eleventh optical surface S11 is a convex spherical shape. The twelfth optical surface S12 is a convex spherical shape. The sixth lens 160 independently constitutes a third lens group G3.

The second lens group G2 can move freely between the first and third lens groups G1 and G2 along an optical axis of the imaging lens system 10 for varying the whole focus length. The position of third lens group G3 can vary relative the first lens group G1 for precision focusing of an object, thereby getting a sharp clear image.

In order to increase resolution and reduce the overall length of the imaging lens system 10, the imaging lens system 10 satisfies the following formulas: (a) Nd2>1.8, (b) Vd2<25, where Nd2 is the refractive index of the second lens 120, Vd2 is the Abbe number of the second lens 120. The formulas (a) and (b) ensure the second lens 120 is as thin as possible without serious degradation in the optical preference such as the chromatic aberration, or the chromatic dispersion, especially under the condition of Nd2=2 and Vd2=19.32.

Exemplarily, along with satisfying formula (a) and (b) above, the imaging lens system 10 also satisfies the following formula: (c) 18<Vd1−Vd2<25, where Vd1 G1R2 is Abbe number of the first lens 110. Satisfying formula (c) coordinates first and second lenses 110 and 120 in optical characters thereby controlling the chromatic aberration and chromatic dispersion in receivable or even perfect conditions, especially in the case of Vd1−Vd2=21.4.

Exemplarily, along with satisfying formula (a), (b) and (c) above, the imaging lens system 10 also satisfies the following formula: (d) Nd3>1.5, (e) Vd3>55, where Nd2 is the refractive index of the third lens 130, Vd3 is the Abbe number of the third lens 130. The formulas (d) and (e) ensure the third lens 130 is as thin as possible without serious degradation in the optical preference such as the chromatic aberration, or the chromatic dispersion, especially under the condition of Nd3=1.58313 and Vd3=59.46.

Exemplarily, the imaging lens system 10 includes a optical stop 190 positioned between the second lens 120 and third lens 130 for stopping stray light travelling in the imaging lens system 10. The f-stop value of the optical stop 190 is variable and preferably varies in a range of 3.5 mm to 4.15 mm.

Light refracted or radiated from an object enters into the imaging lens system 10, travels through the lenses 110 to 160, and converges on an image plane 180 where an image sensor is positioned for transferring the optical signal of the object into electrical signal. A transparent cover 170 is positioned between the sixth lens 160 and the image plane to protect the image sensor from contamination or damage. The transparent cover 170 includes two opposite optical surfaces indicated as S13 and S14 in order from the object side to the image side.

Detailed examples of the imaging lens system 10 are below with references to the accompanying drawings FIGS. 2-7, but it is noteworthy that the imaging lens system 10 is not limited to these examples. Listed below are the symbols used in the detailed examples:

R: radius of curvature.

D: distance between two adjacent lens surfaces along the optical axis of the imaging lens system 10.

Nd: refractive index of lens.

Vd: Abbe constant.

EXAMPLE 1

Tables 1, 2 show the lens data of Example 1.

TABLE 1

| Group | Surface | Shape | R (mm) | D (mm) | Nd | Vd |
|---|---|---|---|---|---|---|
| G1 | S1 | spherical | 215.34 | 0.80 | 1.81 | 40.73 |
| G1 | S2 | aspheric | 5.75 | 1.19 | — | — |
| G1 | S3 | aspheric | 8.59 | 1.40 | 2.00 | 19.32 |
| G1 | S4 | aspheric | 15.15 | D4 (variable) | — | — |
| — | Optical stop | — | Infinity | 0.30 (variable) | — | — |
| G2 | S5 | aspheric | 4.47 | 1.50 | 1.58 | 59.40 |
| G2 | S6 | aspheric | −12.65 | 0.08 | — | — |
| G2 | S7 | spherical | 9.85 | 1.42 | 1.83 | 42.71 |
| G2 | S8 | spherical | 9.85 | 0 | — | — |
| G2 | S9 | spherical | −9.85 | 0.40 | 1.70 | 30.05 |
| G2 | S10 | spherical | 3.01 | D10 (variable) | — | — |
| G3 | S11 | spherical | 160.00 | 1.46 | 1.77 | 49.60 |
| G3 | S12 | spherical | −13.12 | 0.6 | — | — |
| — | S13 | — | Infinity | 0.8 | 1.51872 | 64.2 |
| — | S14 | — | Infinity | — | — | — |

TABLE 2

Aspheric coefficients and Lens surfaces

| | S2 | S3 | S4 | S5 | S6 |
|---|---|---|---|---|---|
| K | −0.6510099 | −0.8177137 | −10.4332 | −0.661778 | −2.057115 |
| a | 0 | 0 | 0 | 0 | 0 |
| b | 0.000216836 | −0.000373802 | −0.000399111 | −0.001466747 | −0.000161975 |
| c | −6.12854E−06 | −2.02464E−05 | −7.35292E−06 | 7.39447E−05 | −0.000127184 |
| d | −1.5004E−07 | 8.74661E−07 | 2.59102E−07 | −6.14474E−05 | 1.3541E−05 |
| e | 3.58865E−08 | 7.74053E−09 | 1.97463E−08 | 5.74569E−06 | −1.11903E−05 |

The aspherical surface is shaped according to the following formula:

$$X = \frac{CY^2}{1+\sqrt{1-(k+1)C^2Y^2}} + aY^2 + bY^4 + cY^6 + dY^8 + eY^{10} + fY^{12},$$

where X indicates functional curve characters as the variation of Y which is a height from the optical axis of the imaging lens system 10 to the aspheric surface, C is a vertex curvature, K is a conic constant, and a through to e are i-th order correction coefficients of the aspheric surfaces.

It is noteworthy that the distance D4 between the first lens group G1 and second lens group G2 as well as the distance between the second and the third lens group G3 is variable for adjusting the focus of the imaging lens system 10. Meanwhile, as the variation of the D4 and D10, the total focus f of the imaging lens system 10, the f-stop value IRIS, the f value of optical stop, and angle of field of view vary simultaneously.

Detailed examples of the variation of those parameters above mentioned are listed below in the cases of f=5.15 mm and f=19.6.

TABLE 3

| f | IRIS | FNO. | 2ω | D4 | D10 |
|---|---|---|---|---|---|
| 5.15 mm | φ3.5 | 3.05 | 80.8° | 11.82 mm | 1.1 mm |
| 19.6 mm | Φ4.15 | 5.9 | 23.1° | 2.83 mm | 18 mm |

As illustrated in FIGS. 2, 3, 6 and 7. The curves a, a1, b, b1 c and c1 respectively indicate the longitudinal and lateral aberration characteristic curves of f light (wavelength: 486.1 nm), d light (587.6 nm), and c light (656.3 nm) when f, d and c light are respectively applied on the imaging lens system 10 with the coefficients listed in Example 1. Wherever the imaging lens system 10 is located between WIDE and TELE conditions, the longitudinal aberration occurring in the imaging lens system 10 of Example 1 approximately ranges from −0.25 mm to 0.25 mm, as well as the lateral aberration ranges from −0.5 um-0.5 um.

Figure 4:
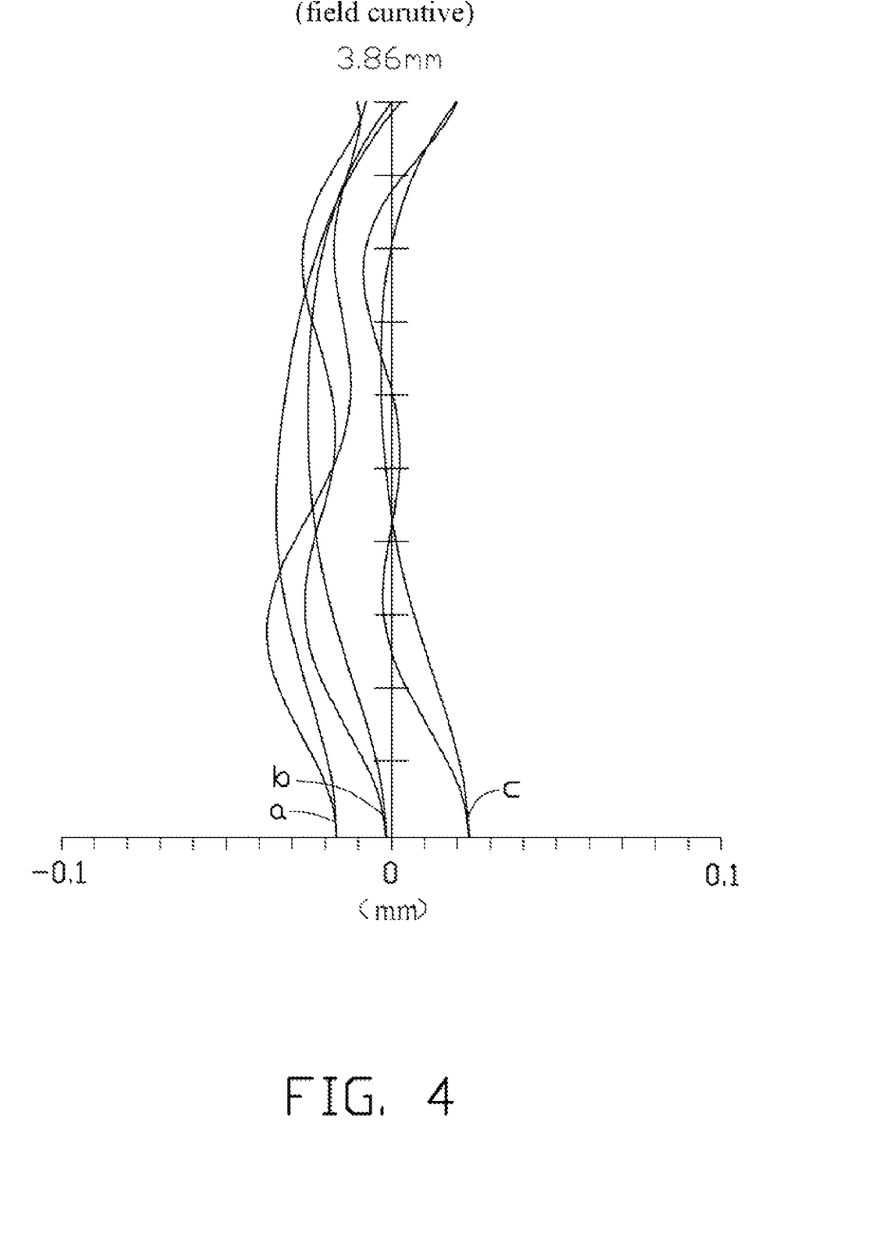
Figure 8:
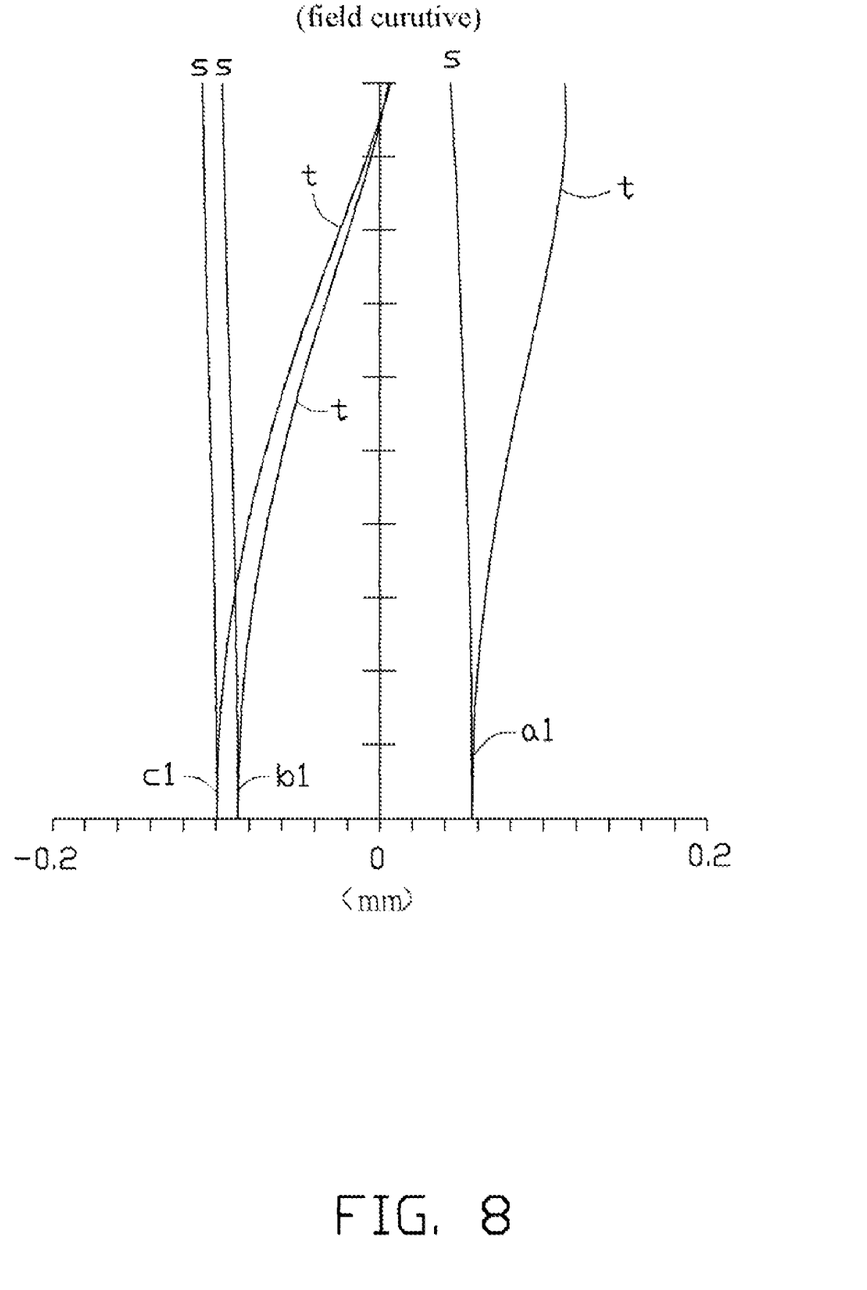

As illustrated in FIGS. 4 and 8, the curves a, a1, b, b1 c and c1 respectively indicate the tangential field curvature and sagittal field curvature of f light (wavelength: 486.1 nm), d light (587.6 nm), and c light (656.3 nm). When f, d and c light are respectively applied on the imaging lens system 10 with the coefficients listed in Example 1. Wherever the imaging lens system 10 is located between WIDE and TELE conditions, the tangential field curvature and sagittal field curvature occurring in the imaging lens system 10 of Example 1 approximately ranges from −0.1 mm to 0.1 mm.

Figure 5:
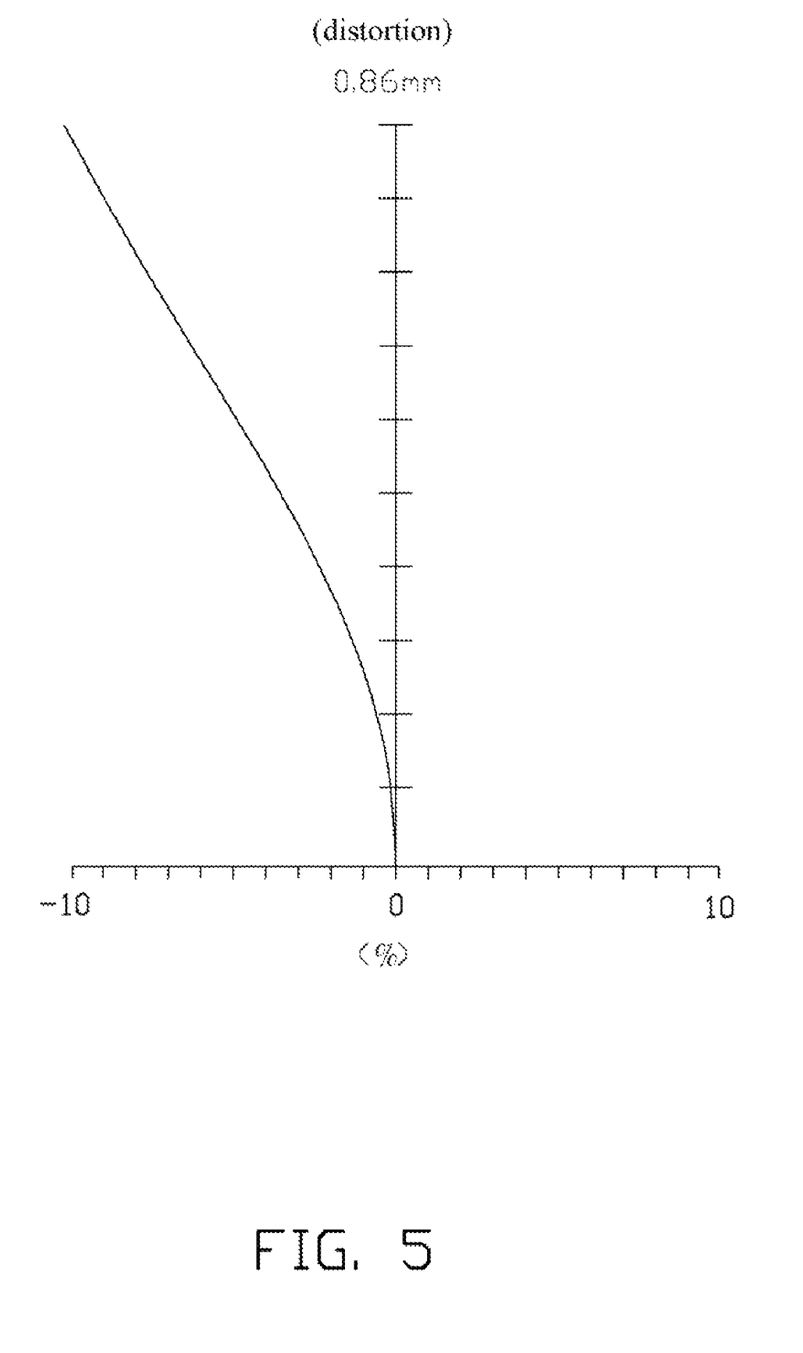
Figure 6:
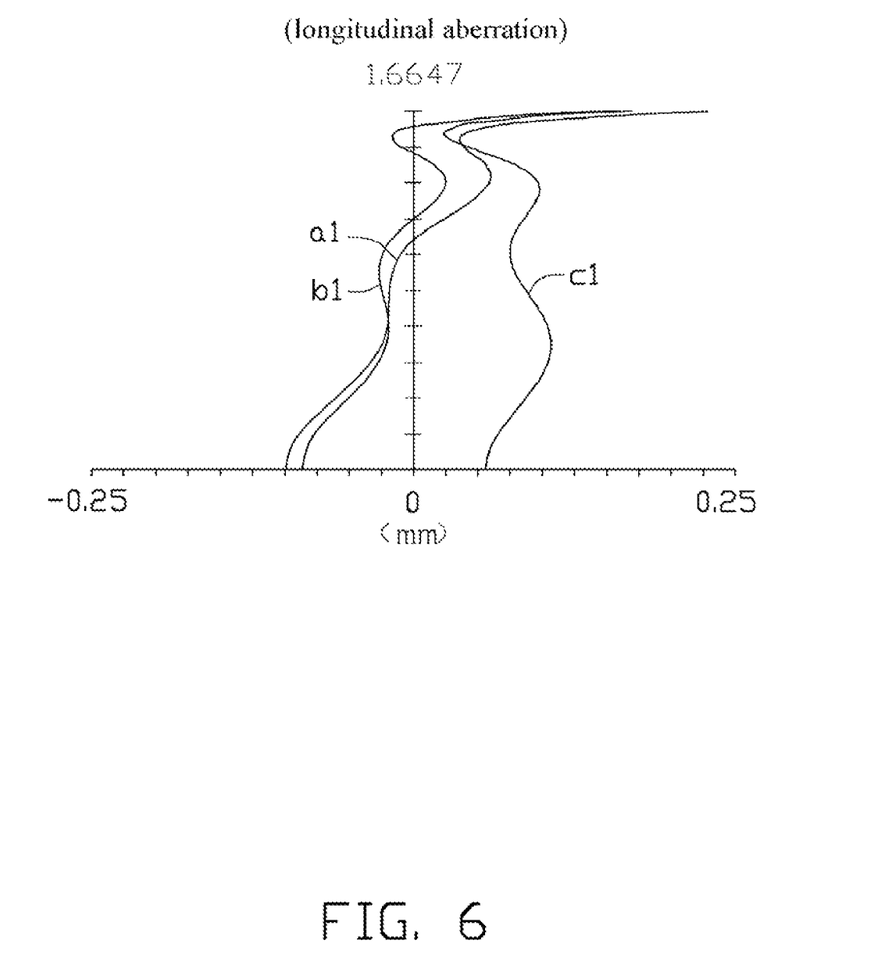
FIGS. 6-9 are graphs respectively showing longitudinal aberration, lateral aberration, field curvature, and distortion occurring in the imaging lens system in accordance with an exemplary embodiment under TELE condition.
Figure 7:
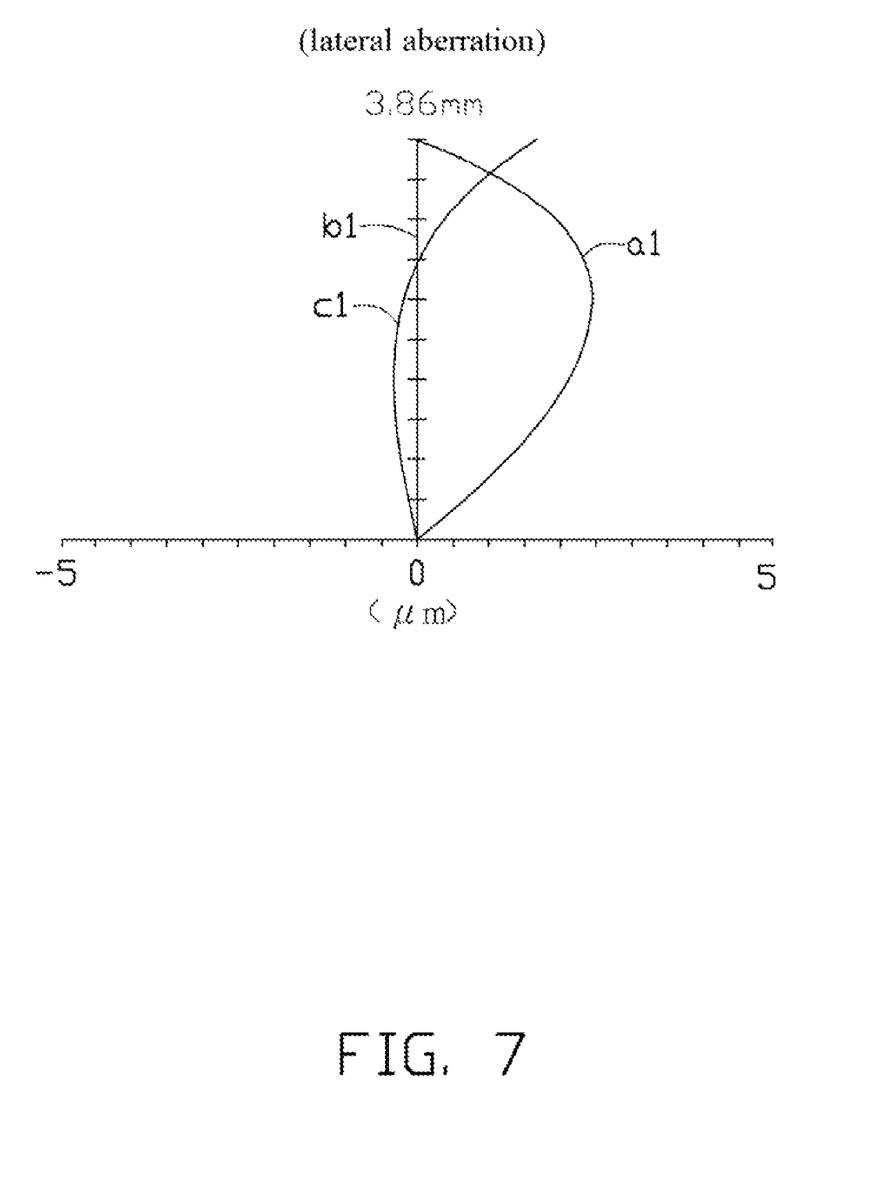
Figure 9:
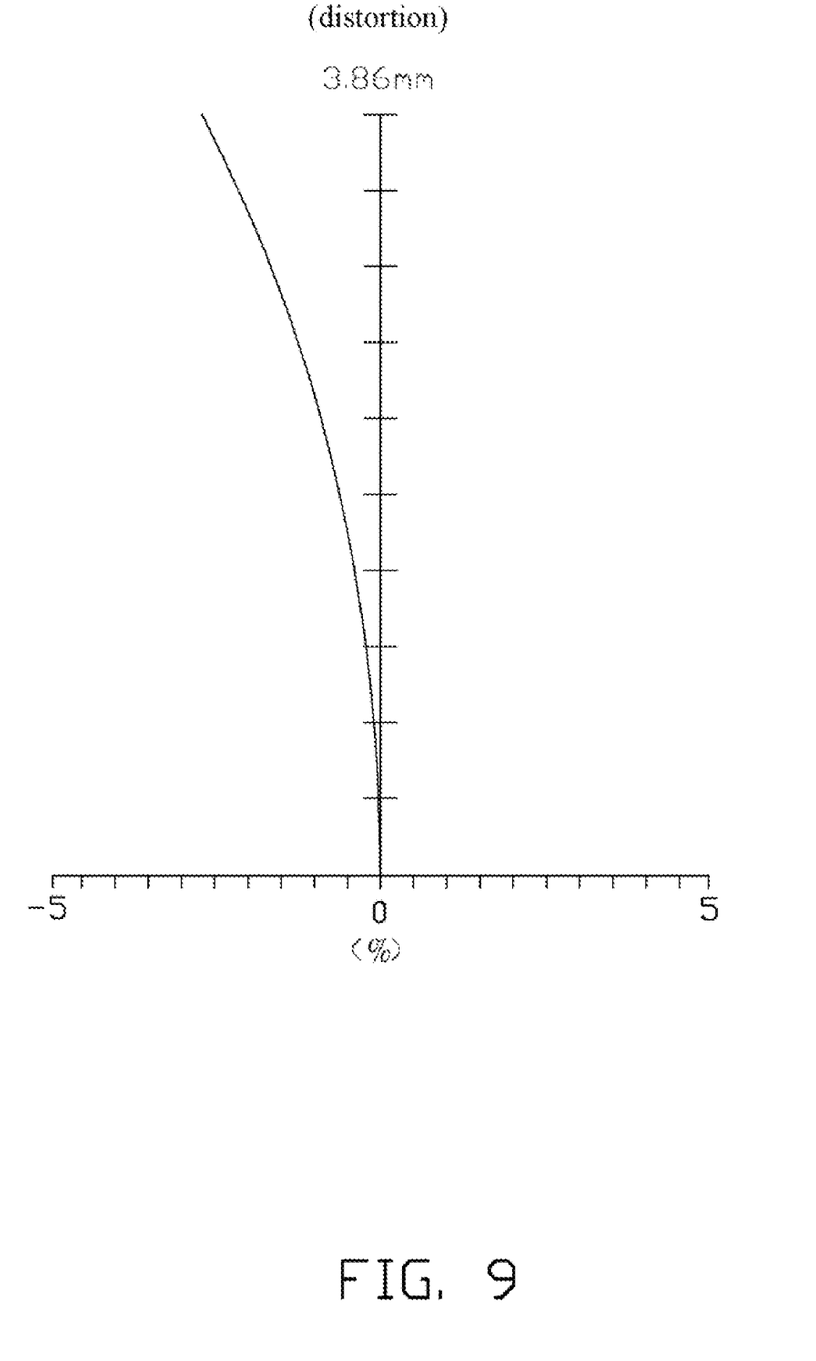

As illustrated in FIGS. 5 and 9, distortion occurring in the imaging lens system 10 of Example 1 is limited to range from −10% to 10%.

Referring to the Examples 1, although the overall length of the imaging lens system 10 has been reduced, the resolution or other optical preferences of the imaging lens system 10 is maintained and improved since the aberration is controlled in an acceptable range.

It is believed that the present embodiments and their advantages will be understood from the foregoing description, and it will be apparent that various changes may be made thereto without departing from the spirit and scope of the disclosure or sacrificing all of its material advantages, the examples hereinbefore described merely being preferred or exemplary embodiments of the disclosure.

What is claimed is:

1. An imaging lens system in order from the object side to the image side comprising a first lens with negative refractive power, a second lens with positive refractive power, a third lens with positive refractive power, a fourth lens with positive refractive power, a fifth lens with negative refractive power and a sixth lens with positive refractive; the imaging lens system satisfying the following formulas: Nd2>1.8 and Vd2<25, where Nd2 is the refractive index of the second lens, Vd2 is the Abbe number of the second lens; and 18<Vd1−Vd2<25, where Vd1 is Abbe number of the first lens.

2. The imaging lens system of claim 1, wherein Nd2 equals 2; Vd2 equals 19.32.

3. The imaging lens system of claim 1, wherein the difference of the formula Vd1−Vd2 equals 21.4.

4. The imaging lens system of claim 1, wherein the imaging lens system further satisfies the following formulas: Nd3>1.5 and Vd3>55, where Nd2 is the refractive index of the third lens, Vd3 is the Abbe number of the third lens.

5. The imaging lens system of claim 4, wherein Nd3 equals 1.58313 and Vd3 equals 59.46.

6. The imaging lens system of claim 5, wherein the first and second lenses cooperatively constitute a first lens group with negative refractive power; the third through to fifth lenses are adhered together in turns to constitute a second lens group with positive refractive power; the sixth lens constitutes a third lens group; the second lens group is capable of moving between the first and third lens group.

7. The imaging lens system of claim 6, further comprising an optical stop positioned between the second lens and the third lens.

8. The imaging lens system of claim 7, wherein the f-stop value of the optical stop is variable in a rang of 3.5 mm to 4.15 mm.

9. The imaging lens system of claim 7, wherein the first lens comprises a first optical surface shaped as convex spherical and a second optical surface shaped as concave aspheric; the second lens comprises a third optical surface shaped as convex aspheric and a fourth optical surface shaped as concave aspheric; the third lens comprises a fifth optical surface shaped as convex aspheric and a sixth optical surface shaped as convex aspheric; the fourth lens comprises a seventh optical surface shaped as convex spherical and an eighth optical surface shaped as convex spherical; the fifth lens comprises a ninth optical surface shaped as concave spherical and a tenth optical surface shaped as concave spherical; the sixth lens comprises an eleventh optical surface shaped as convex spherical, and a twelfth optical surface shaped as convex spherical.

* * * * *